MILLER & JAGELER.
Sled Propeller.

No. 91,253. Patented June 15, 1869.

Witnesses:
H. A. Smith
J. D. Clyde

Inventors:
George W. Miller
John Jageler
P. H. Rihn
Attorney

United States Patent Office.

GEORGE H. MILLER AND JOHN JAGELER, OF BINGHAMTON, NEW YORK.

*Letters Patent No. 91,253, dated June 15, 1869.*

IMPROVED ICE-VELOCIPEDE.

The Schedule referred to in these Letters Patent and making part of the same.

*To all whom it may concern:*

Be it known that we, GEORGE H. MILLER and JOHN JAGELER, of Binghamton, in the county of Broome, and State of New York, have invented a new and useful Improvement on Vehicles for Running on the Ice; and we do hereby declare that the following is a full and exact description of the construction and operation of the same, reference being had to the accompanying drawings, making a part of this specification, in which—

Similar letters of reference indicate corresponding parts in each figure.

Figure 1:
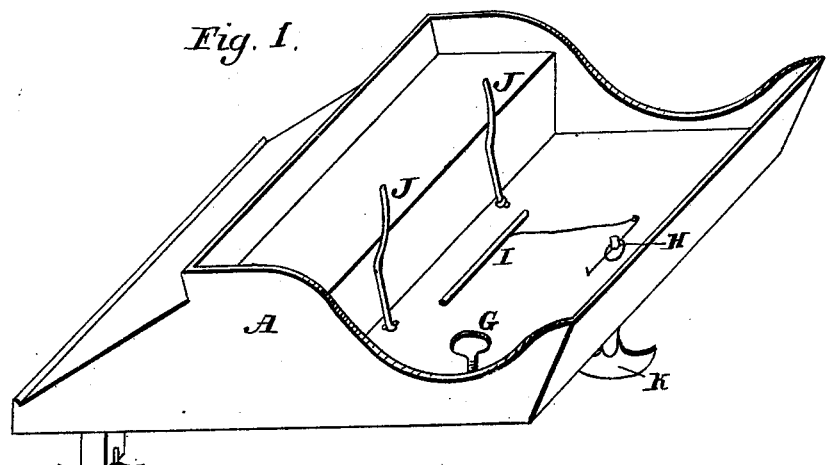
Figure 1 is a perspective view, representing the vehicle in position for operation.
Figure 2:
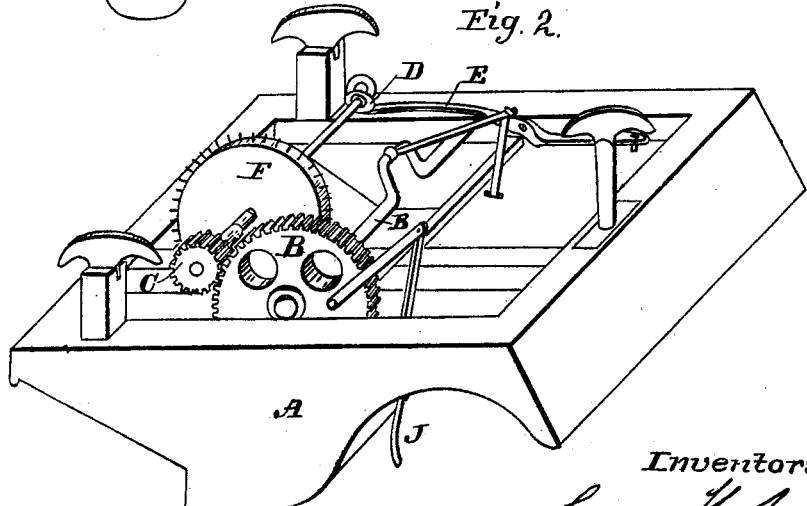
Figure 2 is an inverted view, showing the general arrangement of the parts.

The nature of our invention consists in constructing a vehicle to be operated on the ice, provided with runners, and propelled by means of levers, connected with cranks, which drive a wheel and pinion, the shaft of which works in boxes, supported by adjustable springs, and which carries a driving-wheel, armed with points to keep it from slipping.

We make the body of our sleigh, A, in any of the known forms, under which we place, in a transverse position, a crank-shaft and wheel, B, with a crank-pin set on a line at a right angle with the crank.

This wheel engages with a pinion, C, the bearings of the shaft of which work in a box, D, supported on an adjustable spring, E. In use, we place both boxes on springs.

This shaft carries a driving-wheel, F, armed with points, to prevent it from slipping.

The springs E may be adjusted to any required tension by means of the screw G, the handle of which should extend far enough above the floor of the vehicle for the operator to control it conveniently without changing his position.

The sleigh runs upon three runners, two of which we place back, and one near the forward end, which is pivoted, working in a socket in the floor, for the purpose of giving direction to the vehicle.

The upper end of said pivot extends through the socket, and has attached to it a horizontal bar, H, connected with a cross-bar, I, which works on a pin, in the centre, near the feet of the operator.

We then make two operating-levers, J J, with their fulcra on the floor of the vehicle, the shorter arm extending below, and the handles far enough above to operate them while sitting upon the seat. These levers connect with the cranks in the usual manner.

When we use our invention, the operator takes his seat between the levers J J, turns up the adjusting-screw G for the purpose of giving the required traction to the driving-wheel for starting, places his feet on the cross-bar I, and puts the vehicle in motion by moving the levers, changing the direction by turning the forward runner K, by pressing upon the right or left end of the bar I with the feet.

When the desired speed has been attained, and the ice is smooth, the tension of the spring may be relieved by turning down the adjusting-screw, and *vice versa.*

We are aware that there are similar devices patented by F. G. Johnson, July 11, 1862, and E. N Huntsman, February 2, 1869. The former uses "elastic" bearings for the spur-wheel shaft, working on spiral springs, placed entirely away from the control of the operator while the vehicle is in motion, and which has a uniform pressure upon the ice at a high and low degree of speed, while in our arrangement the wheel-shaft works on adjustable steel springs, readily controlled by the operator, by means of the adjusting-screw, as described, so that when running at high speed the driving-wheel may be raised clear from the ice, if necessary, thereby obviating the use of disks or guards, to prevent the spurs from penetrating the ice too far. We therefore disclaim any interference with the above-mentioned patents, and confine ourselves only to the novel features of our invention.

Having thus described our invention,

What we claim, and desire to secure by Letters Patent, is—

The adjustable spring E and adjusting-screw G, in combination with the box D, shaft and pinion C, driving-wheel F, toothed wheel B, and directing-runner K, all being constructed and operating as herein described and represented, for the purpose set forth.

GEORGE H. MILLER.
JOHN JAGELER.

Witnesses:
JAMES D. CLYDE,
HENRY A. SMITH.